United States Patent
Kim et al.

(10) Patent No.: US 11,136,075 B2
(45) Date of Patent: Oct. 5, 2021

(54) ENGINE ROOM UNDERCOVER ASSEMBLY FOR VEHICLE

(71) Applicants: Hyundai Motor Company, Seoul (KR); Kia Motors Corporation, Seoul (KR); Industry-University Cooperation Foundation Korea Aerospace University, Gyeonggi-do (KR)

(72) Inventors: Un-Tae Kim, Gyeonggi-do (KR); Ju-Yeol You, Gyeonggi-do (KR); Moon-Sang Kim, Gyeonggi-do (KR)

(73) Assignees: Hyundai Motor Company, Seoul (KR); Kia Motors Corporation, Seoul (KR); Industry-University Cooperation Foundation Korea Aerospace University, Gyeonggi-do (KR)

( * ) Notice: Subject to any disclaimer, the term of this patent is extended or adjusted under 35 U.S.C. 154(b) by 69 days.

(21) Appl. No.: 16/680,845

(22) Filed: Nov. 12, 2019

(65) Prior Publication Data

US 2020/0353999 A1 Nov. 12, 2020

(30) Foreign Application Priority Data

May 8, 2019 (KR) .......................... 10-2019-0053688

(51) Int. Cl.
*B62D 35/02* (2006.01)
(52) U.S. Cl.
CPC .................... *B62D 35/02* (2013.01)

(58) Field of Classification Search
CPC .... B62D 35/001; B62D 35/008; B62D 35/02; B62D 37/02
USPC ........................................... 296/180.1, 180.3
See application file for complete search history.

(56) References Cited

U.S. PATENT DOCUMENTS

| | | | | |
|---|---|---|---|---|
| 7,845,709 | B2* | 12/2010 | Browne | B62D 35/001 296/180.5 |
| 9,932,074 | B2* | 4/2018 | Sarhadiangardabad | B62D 37/02 |
| 10,167,026 | B2* | 1/2019 | Wiech | B62D 35/005 |
| 10,421,505 | B2* | 9/2019 | Tjoelker | B62D 35/02 |
| 2014/0070564 | A1* | 3/2014 | Bernard | B62D 35/005 296/180.3 |
| 2015/0008698 | A1* | 1/2015 | Reisenhofer | B62D 25/2072 296/180.1 |

FOREIGN PATENT DOCUMENTS

KR    10-2005-0061229 A    6/2005

* cited by examiner

*Primary Examiner* — Jason S Daniels
(74) *Attorney, Agent, or Firm* — Mintz Levin Cohn Ferris Glovsky and Popeo, P.C.; Peter F. Corless (57) ABSTRACT

An engine room undercover assembly for a vehicle includes an aerofin mounted on a lower side surface of the undercover to guide airflow under an undercover. In the engine room undercover assembly, the aerofin is configured to maintain a state of being inserted and folded into the undercover when the vehicle is stopped or travels at a speed of less than or equal to a predetermined speed. When the vehicle travels at the speed greater than the predetermined speed, the aerofin protruded to the outside of the undercover to guide the airflow under the undercover.

19 Claims, 10 Drawing Sheets

ENGINE ROOM UNDERCOVER ASSEMBLY FOR VEHICLE

CROSS-REFERENCE TO RELATED APPLICATION

This application claims under 35 U.S.C. § 119(a) the benefit of Korean Patent Application No. 10-2019-0053688, filed on May 8, 2019, the entire contents of which are incorporated herein by reference.

BACKGROUND

(a) Technical Field

The present disclosure relates to an engine room undercover assembly for a vehicle, more particularly, to the engine room undercover assembly having an aerofin mounted on a lower side surface of an undercover to guide the airflow direction under the undercover is applied.

(b) Description of the Related Art

Generally, airflow under an underbody collides against a suspension and various chassis parts upon movement of the vehicle to slow down a flow rate and spread the airflow to the side of the vehicle, thereby increasing the width of a wake to increase the drag.

Therefore, in order to reduce the drag, it is also important to apply an undercover to the underbody to flatten the lower side surface of the underbody, but it is very important to collect the flow under the underbody in the center so as not to spread the airflow to the side of the vehicle.

For this purpose, although a guide pin has been conventionally applied to a lower side surface of the undercover so that the airflow under the underbody does not spread to the side of the vehicle, there has been a problem in that the guide pin may be interfered with when the vehicle passes through an uneven road and a speed bump, thereby causing deformation or breakage of parts.

The contents described in Description of the Related Art are to help the understanding of the background of the present disclosure, and can include what is not previously known to those skilled in the art to which the present disclosure pertains.

SUMMARY

The present disclosure provides an aerofin configured to maintain a state of being folded inside an undercover at a low speed (i.e., less than or equal to a predetermined speed), and protruded to an outside of the undercover to guide an airflow under the undercover only at a high speed (i.e., greater than the predetermined speed) in which aerodynamic performance becomes important.

In an engine room undercover assembly for a vehicle of the present disclosure, an aerofin configured to maintain a state of being inserted and folded into an undercover when a vehicle is stopped or travels at a speed of less than or equal to a predetermined speed, and when the speed is greater than the predetermined speed, the aerofin is protruded to an outside of the undercover, where the aerofin is mounted on a lower surface of the undercover for the vehicle.

The aerofin preferably has a square plate shape, and a cross-sectional shape of the aerofin is an airfoil shape in which curvatures of an outside surface and an inside surface thereof are different from each other in a front-rear direction of the vehicle.

More preferably, the curvature of the outside surface of the aerofin is greater than the curvature of the inside surface thereof.

A plurality of the aerofins may be mounted to be symmetrical to each other with respect to a central line in a width direction of the vehicle.

For example, the aerofins at positions that are symmetrical to each other with respect to the central line in the width direction of the vehicle may be parallel with each other.

The aerofins at the positions that are symmetrical to each other with respect to the central line in the width direction of the vehicle may gradually become close to each other toward the rear end of the vehicle.

A fixing part may extend at a certain length in the front-rear direction of the vehicle, where a fixing hole penetrating both ends thereof formed therein is formed at one side of the aerofin in the width direction of the vehicle.

A guide groove of a certain depth having the aerofin inserted therein may be formed on the lower surface of the undercover.

Each of the front and rear surfaces of the guide groove may be formed with a fixing pin groove that is coaxial with each other in the front-rear direction of the vehicle.

A pressure hole for communicating the inner and outer portions of the undercover may be formed in the bottom surface of the guide groove.

The aerofin preferably penetrates the fixing hole, and is fixed to the undercover by the fixing pin having both ends inserted into the fixing pin groove, respectively.

A coil spring may be inserted into any one side of both ends of the fixing pin.

The coil spring may be coaxial with the fixing pin, and may have one end fixed to the outside surface of the aerofin to apply a spring force to the aerofin.

The aerofin may be pulled to the undercover side by the spring force of the coil spring.

When the air under the undercover passes through the aerofin at the traveling of the vehicle, a speed difference and a pressure difference may occur between the inside surface and the outside surface of the aerofin due to a difference of the curvatures of the inside surface and the outside surface of the aerofin.

Preferably, a pressure applied to the inside surface of the aerofin gradually increases, and a pressure applied to the outside surface of the aerofin gradually reduces through the pressure hole as the vehicle speed increases.

When a sum of a pressure applied to the inside surface of the aerofin and a pressure applied to the outside surface of the aerofin is greater than the spring force of the coil spring, the aerofin rotates with the fixing pin as a rotary axis thereof.

When the aerofin has rotated to be protruded to the outside of the guide groove, magnitudes of lift forces acting on the inside surface and the outside surface of the aerofin become different from each other due to the cross-sectional shape of the airfoil shape.

The unfolded angle of the aerofin is adjusted according to the balance of the force between the lift acting on the aerofin and the spring force of the coil spring.

A speed of the vehicle at which the aerofin is completely unfolded is determined by the adjustment of the spring force of the coil spring.

According to the present disclosure, it is possible to apply the aerofin to the lower surface side of the undercover to collect the airflow under the vehicle in order not to spread (i.e., to substantially prevent spreading of) the airflow, thereby improving aerodynamic performance.

In addition, the unfolded angle of the aerofin is controlled by the air force according to the vehicle speed, and when the vehicle passes through the speed bump or the rough road, etc. or during the high pressure wash, the aerofin can be inserted into the undercover, thereby preventing damages caused by the collision with the ground or the water pressure, and the aerofin can be unfolded only in the high speed traveling condition where the aerodynamic performance is most predominantly required, thereby improving the durability.

In addition, according to the present disclosure, it is unnecessary to additionally provide a speed sensor and a driving motor, etc., thereby being advantageous in terms of cost and weight, and reducing the assembly process by reducing the number of parts to also save production line installation and assembly costs.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

For a better understanding of the present disclosure, preferred embodiments of the present disclosure will be described with reference to the accompanying drawings. The embodiments of the present disclosure can be modified in various forms, and the scope of the present disclosure should not be construed as being limited to the embodiments described in detail below. The present embodiments are provided to enable those skilled in the art to more fully understand the present disclosure. Therefore, the shapes and the like of the elements in the drawings can be exaggeratedly expressed to emphasize a clearer description. It should be noted that the same components are denoted by the same reference numerals in each drawing. Detailed descriptions of well-known functions and configurations that can be unnecessarily obscured by the subject matter of the present disclosure are omitted.

The present disclosure relates to an engine room undercover assembly for a vehicle, in which an aerofin is mounted on a lower side surface of an undercover to guide the airflow direction under the undercover.

Figure 1:
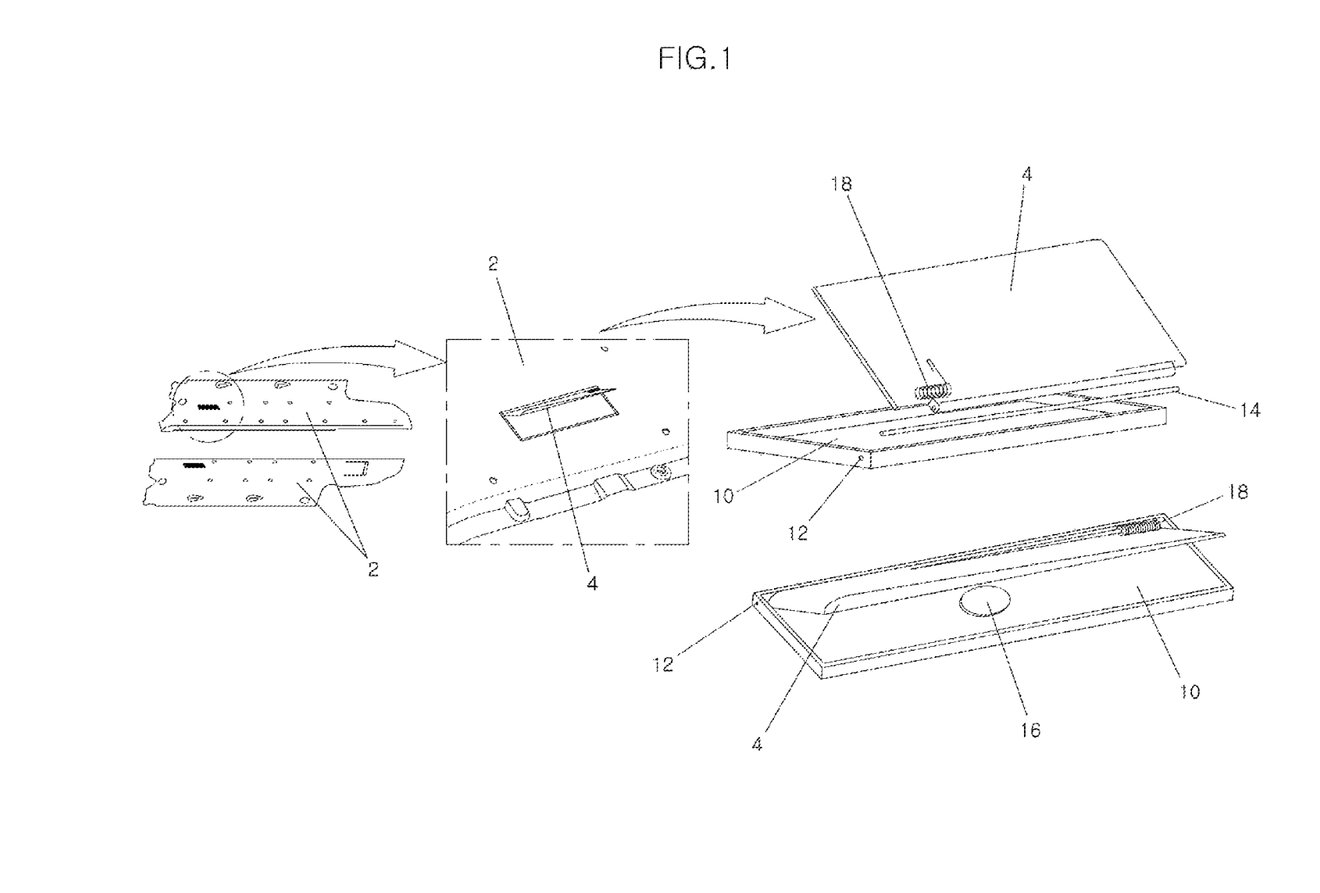
FIG. 1 is a schematic diagram illustrating an aerofin installed at an engine room undercover assembly for a vehicle according to the present disclosure.

FIG. 1 is a diagram illustrating an aerofin installed at an engine room undercover assembly for a vehicle according to the present disclosure.

The aerofin 4 is mounted on a lower surface of an undercover 2, and is configured to maintain a state of being inserted and folded into the undercover 2 when the vehicle is stopped or travels at a low speed (i.e., less than or equal to a predetermined speed), and guides the airflow under the undercover 2 when traveling at a high speed (i.e., greater than the predetermined speed).

Figure 2:
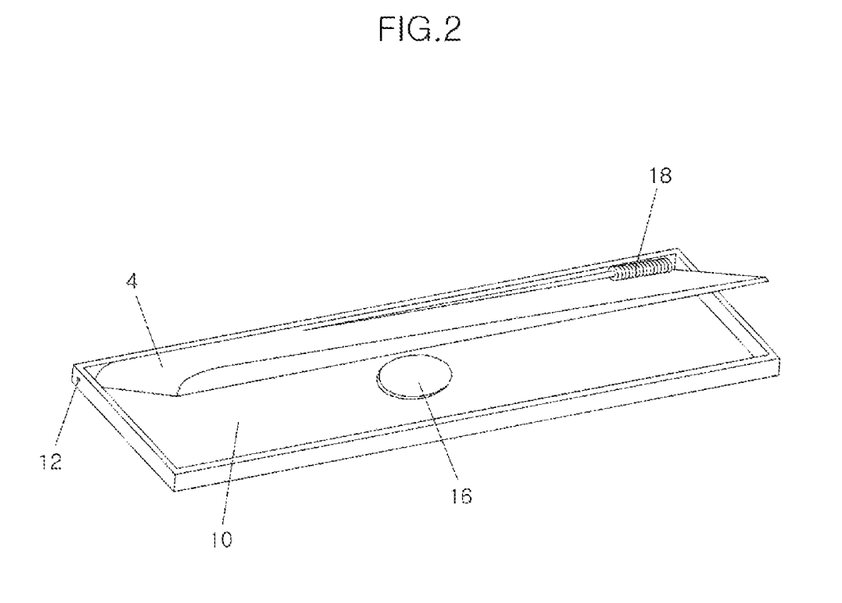
FIG. 2 is an exemplary diagram illustrating a cross-sectional shape of the aerofin according to the present disclosure.

The aerofin 4 preferably has a square plate shape, and as illustrated in FIG. 2, has a cross-sectional shape of an airfoil shape in which curvatures of an outside surface and an inside surface thereof are different from each other in a front-rear direction of the vehicle.

The curvature of the outside surface of the aerofin 4 is formed to be greater than the curvature of the inside surface thereof, and according to such a shape, when the air under the vehicle passes through the aerofin 4, a speed difference and a pressure difference occur between the inside surface and the outside surface of the aerofin 4.

A plurality of the aerofins 4 is mounted to be symmetrical to each other with respect to a central line in a width direction of the vehicle.

A fixing part 6 extended at a certain length in the front-rear direction of the vehicle, and having a fixing hole 8 penetrating both ends thereof formed therein is formed at one side of the aerofin 4 in the width direction of the vehicle.

The fixing hole 8 is penetrated by a fixing pin 14, and a coil spring 18 is inserted into any one side of both ends of the fixing pin 14 penetrating the fixing hole 8.

The coil spring 18 is coaxial with the fixing pin 14, has one end fixed to the outside surface (the surface facing the ground at the folding of the aerofin) of the aerofin 4, and has the other end fixed to a guide groove 10 to apply a spring force to the aerofin 4.

The aerofin 4 is pulled to the undercover 2 side by the spring force of the coil spring 18.

The guide groove 10 of a certain depth having the aerofin 4 inserted therein is formed on the lower surface of the undercover 2.

The guide groove 10 has the cross section having the same shape and size as the cross section of the undercover 2, and each of the front and rear surfaces of the guide groove 10 is formed with a fixing pin groove 12 that is coaxial with each other in the front-rear direction of the vehicle.

Both ends of the fixing pin 14 penetrating the fixing hole 8 are inserted into the fixing pin groove 12 to fix the aerofin 4 and the undercover 2, respectively.

A pressure hole 16 for communicating the inner and outer portions of the undercover 2 is formed on the bottom surface of the guide groove 10.

The internal air of the vehicle applies pressure to the inside surface of the aerofin 4 through the pressure hole 16, and the aerofin 4 is unfolded or folded according to the magnitude of the pressure.

Hereinafter, the unfolded state of the aerofin according to the traveling speed of the vehicle will be described with reference to FIGS. 3 to 5.

According to the Bernoulli effect, the pressure reduces as the airflow speed increases.

That is, a pressure applied to the inside surface of the aerofin 4 gradually increases, and a pressure applied to the outside surface of the aerofin 4 is gradually reduced through the pressure hole 16 as the vehicle speed increases.

Figure 3:
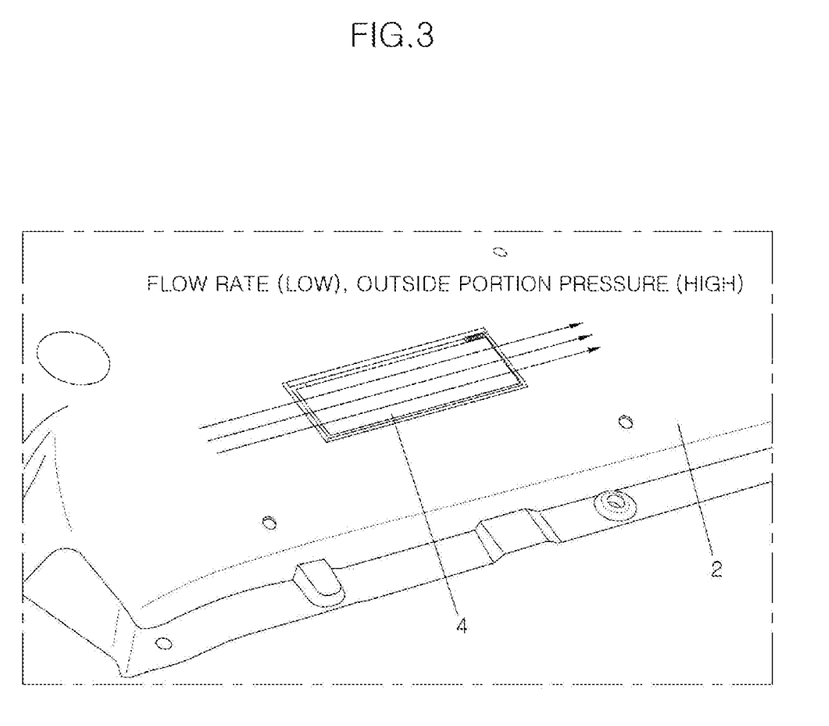
FIG. 3 is a schematic diagram illustrating the unfolded state of the aerofin at a low speed of traveling according to the present disclosure.

As illustrated in FIG. 3, the pressure vertically acting on the outside surface of the aerofin 4 is relatively greater than the pressure acting on the inside surface of the aerofin 4 in the stopped/low speed traveling section.

At this time, since the spring force of the coil spring 18 also pulls the aerofin 4 to the undercover 2 side, the aerofin 4 keeps a state that has been inserted and folded into the guide groove 10.

Since the air resistance is not large in the low speed traveling section, the role of the aerofin 4 is not large and the aerofin 4 is kept in the folded state, thereby preventing a collision with the aerofin 4 when the vehicle passes over a speed bump or a rough road, etc.

Figure 4:
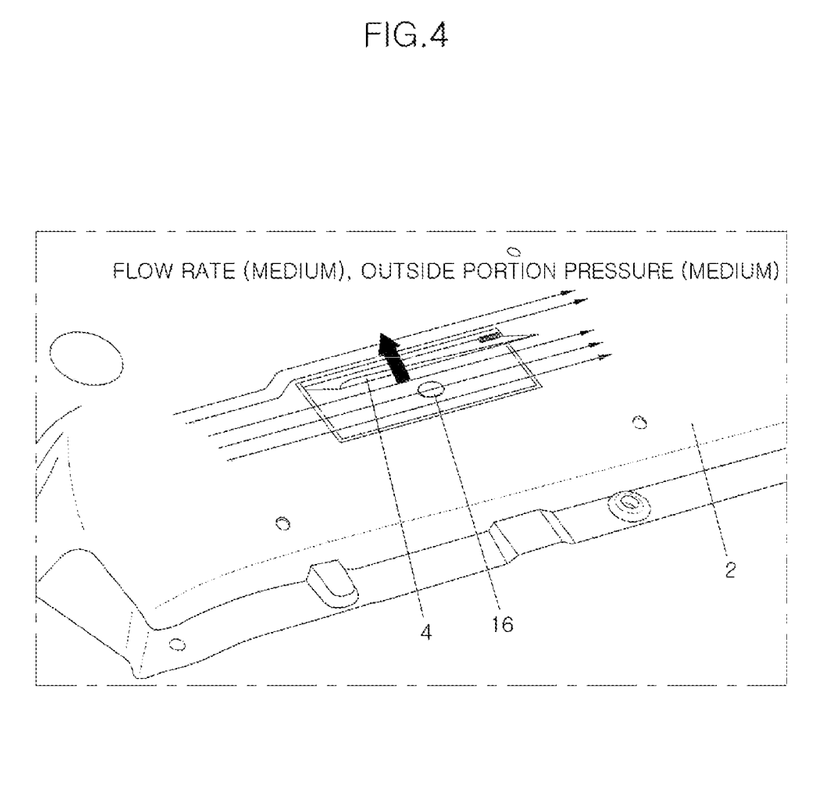
FIG. 4 is a schematic diagram illustrating the unfolded state of the aerofin at a medium speed of traveling according to the present disclosure.
Figure 5:
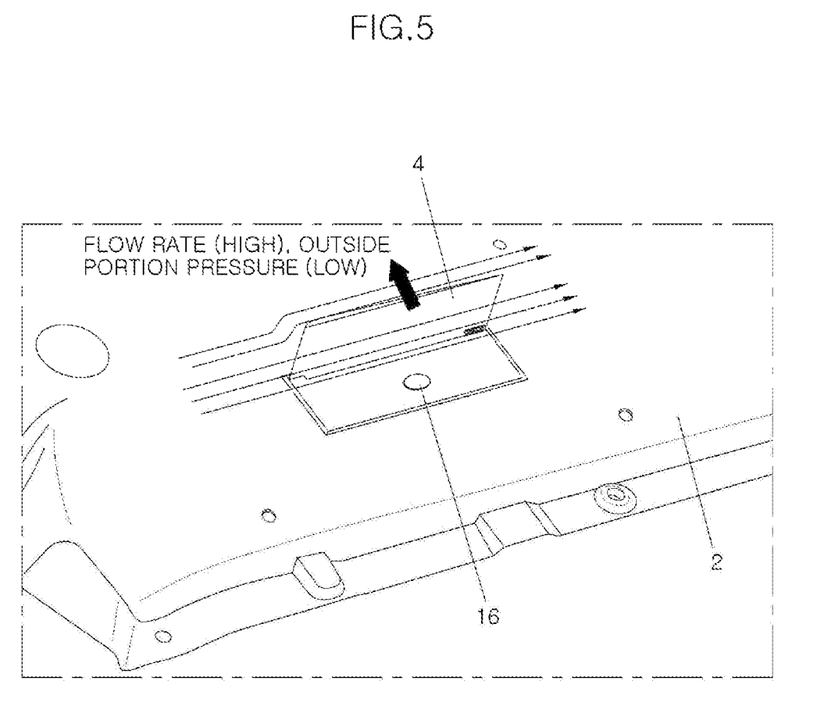
FIG. 5 is a schematic diagram illustrating the unfolded state of the aerofin at a high speed of traveling according to the present disclosure.

As illustrated in FIGS. 4 and 5, in the medium speed/high speed traveling section, the airflow at the outside surface of the aerofin 4 becomes faster, thereby gradually reducing the pressure.

On the other hand, since the pressure of the internal air of the vehicle applied to the inside surface of the aerofin 4 through the pressure hole 16 is relatively large, a sum of the pressure applied to the inside surface of the aerofin 4 and the pressure applied to the outside surface of the aerofin 4 becomes greater than the spring force of the coil spring 18, and at this time, as illustrated in FIG. 4, the aerofin 4 starts to be protruded to the outside of the undercover 2 while rotating with the fixing pin 14 as a rotary axis thereof.

When the aerofin 4 has rotated to be protruded to the outside of the guide groove 10, a speed difference occurs between the inside surface and the outside surface of the aerofin 4 due to the cross-sectional shape of the airfoil shape, and due to the thereby occurred pressure difference, magnitudes of lift forces acting on the inside surface and the outside surface of the aerofin 4 become different from each other.

At this time, the unfolded angle of the aerofin 4 is adjusted according to the balance of the force between the lift acting on the aerofin 4 and the spring force of the coil spring 18.

As the traveling speed increases, the pressure acting on the inside surface of the aerofin 4 also increases gradually, and the traveling speed of the vehicle at which the aerofin 4 is completely unfolded can be determined according to the adjustment of the spring force of the coil spring 18.

The unfolded angle of the aerofin 4 is a maximum of 90 degrees.

The position and the angle of the aerofin 4 are adjustable, and can be adjusted in the form of more effectively collecting the airflow under the vehicle to the central line side of the vehicle according to the characteristics of the vehicle.

Figure 6:
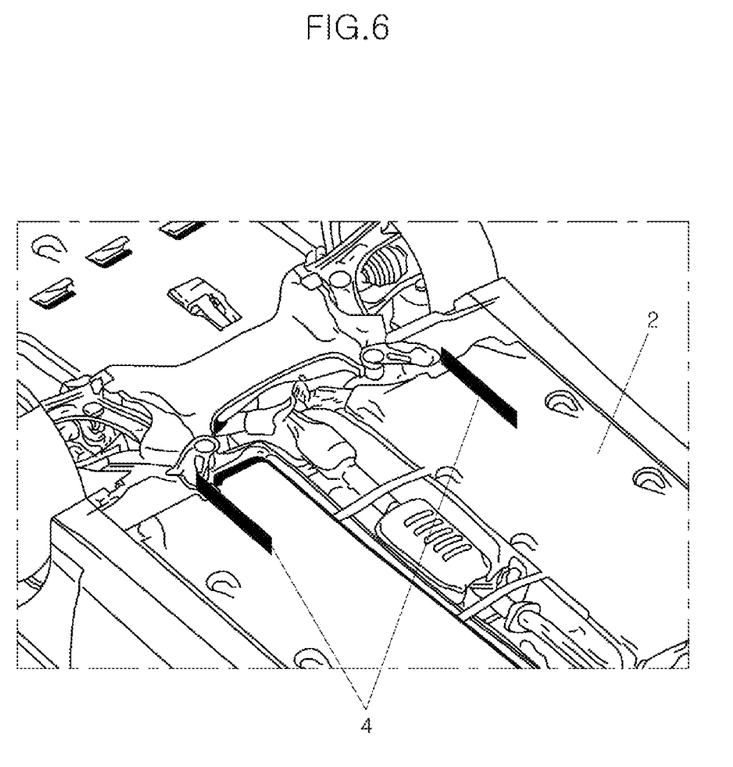
FIG. 6 is a schematic diagram illustrating a first embodiment of a position of the aerofin according to the present disclosure.
Figure 7:
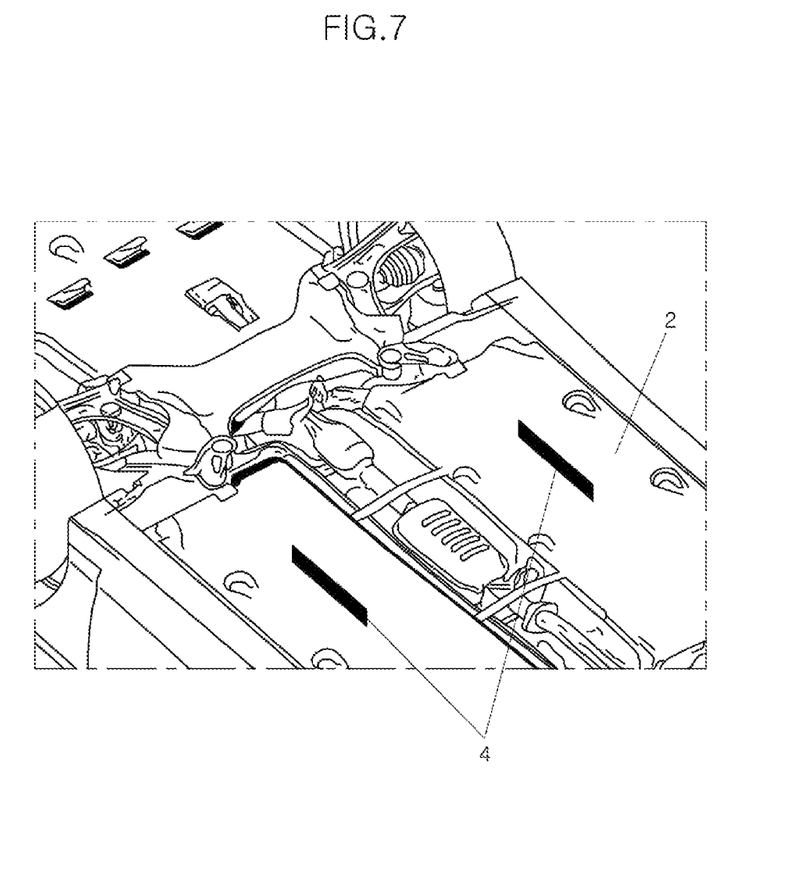
FIG. 7 is a schematic diagram illustrating a second embodiment of a position of the aerofin according to the present disclosure.
Figure 8:
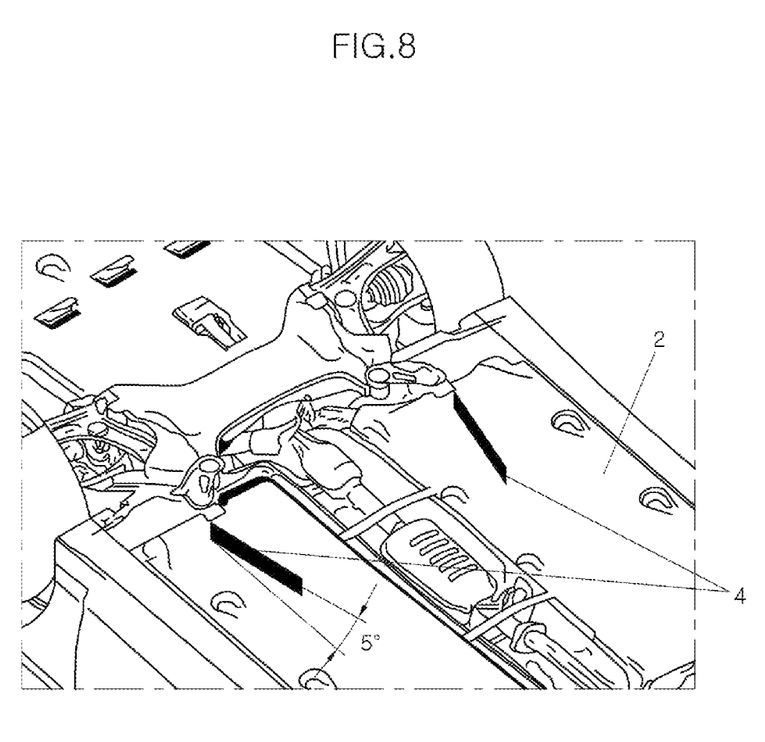
FIG. 8 is a schematic diagram illustrating a third embodiment of a position of the aerofin according to the present disclosure.

For example, as illustrated in FIG. 6 or FIG. 7, the aerofins 4 at positions that are symmetrical to each other with respect to a central line in a width direction of the vehicle can be disposed to be parallel to each other, or as illustrated in FIG. 8, can also be disposed to gradually become close to each other toward the rear end of the vehicle.

FIGS. 6 and 7 are diagrams illustrating changes in the mounted positions of the aerofin 4 according to the condition of the vehicle on the undercover 2 between a front tire and a rear tire of the vehicle, and FIG. 8 is a diagram illustrating a change in the mounted angle of the aerofin 4 so that the aerofin 4 faces the central line of the vehicle from the front end of the vehicle toward the rear end thereof in order to further collect the flow under the vehicle to the central line side of the vehicle.

Figure 9:
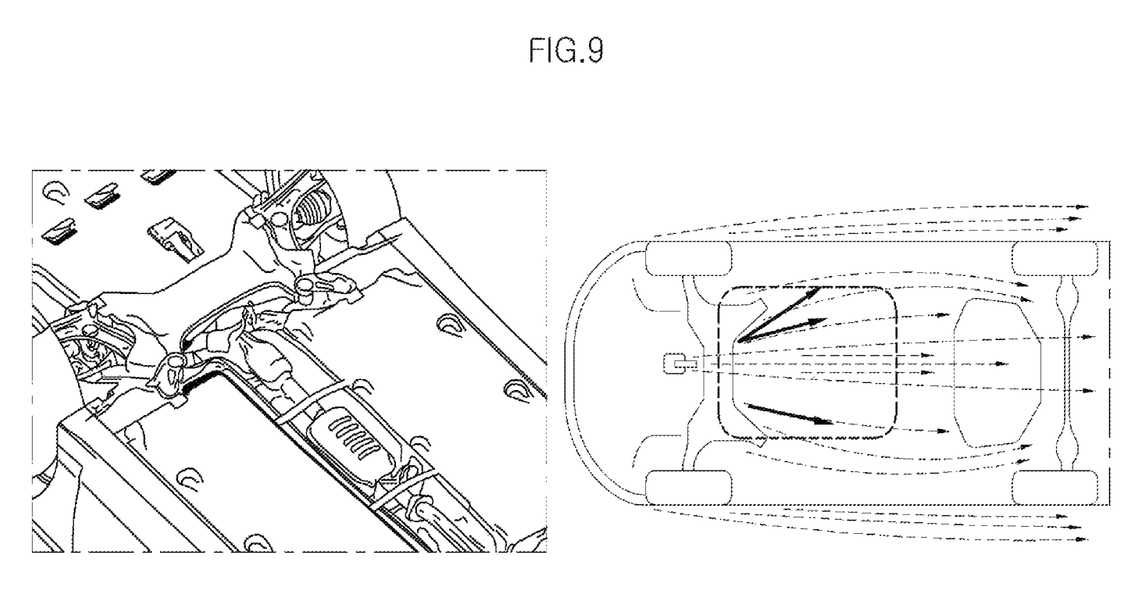
FIG. 9 is a schematic diagram illustrating an analyzed result of a flow change under the undercover at the time of not applying the aerofin according to the present disclosure.
Figure 10:
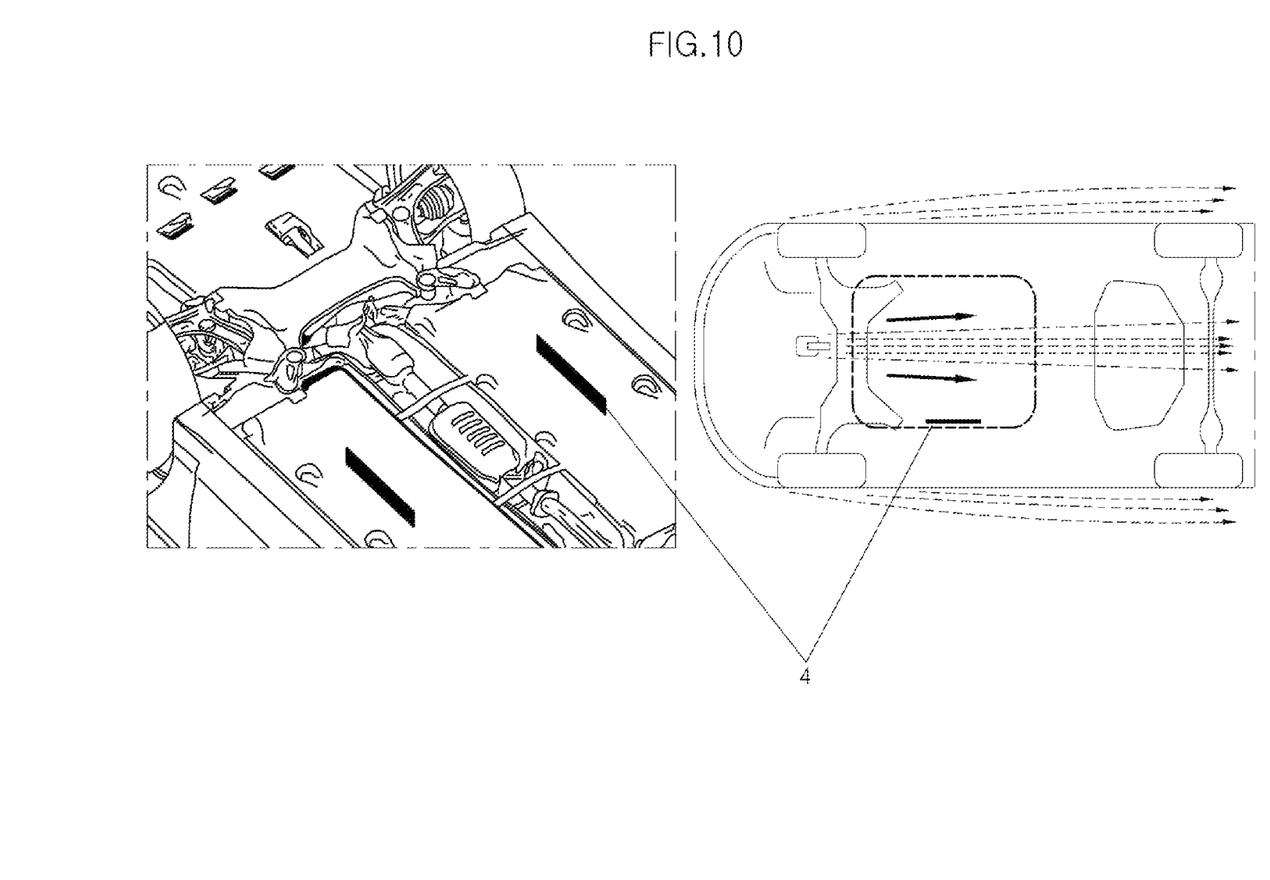
FIG. 10 is a schematic diagram illustrating an analyzed result of the flow change under the undercover at the time of applying the aerofin according to the present disclosure.

FIG. 9 is a diagram illustrating an analyzed result of a flow change under the undercover at the time of not applying the aerofin according to the present disclosure, and FIG. 10 is a diagram illustrating an analyzed result of a flow change under the undercover at the time of applying the aerofin according to the present disclosure.

It can be confirmed that the airflow passing through the central line under the vehicle at the time of not applying the aerofin 4 spreads in the width direction of the vehicle after a certain length in the longitudinal direction of the vehicle.

On the other hand, it can be confirmed that the airflow passing through the central line under the vehicle at the time of applying the aerofin 4 does not spread in the width direction of the vehicle even at the portion after the certain length in the longitudinal direction of the vehicle and is collected to the central line side of the vehicle.

Therefore, the completely unfolded aerofin 4 collects the airflow under the vehicle in order to substantially prevent spreading of the airflow in the width direction of the vehicle, thereby improving aerodynamic performance.

As described above, the embodiments of the engine room undercover assembly for the vehicle of the present disclosure are merely illustrative, and those skilled in the art to which the present disclosure pertains will appreciate that various modifications and equivalent embodiments therefrom are possible. Therefore, it can be understood that the present disclosure is not limited to the form set forth in the foregoing description. Therefore, the true technical scope of the present disclosure should be determined by the technical spirit of the appended claims. In addition, it should be understood that the present disclosure includes all modifications, equivalents, and alternatives falling within the spirit and scope of the present disclosure as defined by the appended claims.

What is claimed is:

1. An engine room undercover assembly for a vehicle, comprising:
    an aerofin configured to maintain a state in which the aerofin has been inserted and folded into an undercover when the vehicle is stopped or travels at a speed of less than or equal to a predetermined speed, and
    when the vehicle travels at the speed greater than the predetermined speed, the aerofin is protruded to an outside of the undercover to guide airflow under the undercover,
    wherein the aerofin is mounted on a lower surface of the undercover, and
    wherein the aerofin has a square plate shape, and a cross-sectional shape of the aerofin is an airfoil shape in which curvatures of an outside surface and an inside surface thereof are different from each other in a front-rear direction of the vehicle.

2. The engine room undercover assembly for the vehicle of claim 1,
    wherein the curvature of the outside surface of the aerofin is greater than the curvature of the inside surface thereof.

3. The engine room undercover assembly for the vehicle of claim 2,
    wherein when air under the undercover passes through the aerofin when the vehicle is traveling, a speed difference and a pressure difference occur between the inside surface and the outside surface of the aerofin due to a difference of the curvatures of the inside surface and the outside surface of the aerofin.

4. The engine room undercover assembly for the vehicle of claim 3,
    wherein a pressure applied to the inside surface of the aerofin gradually increases, and a pressure applied to the outside surface of the aerofin gradually reduces through the pressure hole as the vehicle speed increases.

5. The engine room undercover assembly for the vehicle of claim 4,
    wherein when a sum of the pressure applied to the inside surface of the aerofin and a pressure applied to the outside surface of the aerofin is greater than the spring force of the coil spring, the aerofin rotates with the fixing pin as a rotary axis thereof.

6. The engine room undercover assembly for the vehicle of claim 5,
    wherein when the aerofin has rotated to be protruded to the outside of the guide groove, magnitudes of lift forces acting on the inside surface and the outside surface of the aerofin become different from each other due to the cross-sectional shape of the airfoil shape.

7. The engine room undercover assembly for the vehicle of claim 6,
    wherein an unfolded angle of the aerofin is adjusted according to a balance of the force between the lift acting on the aerofin and the spring force of the coil spring.

8. The engine room undercover assembly for the vehicle of claim 7,
    wherein a speed of the vehicle at which the aerofin is completely unfolded is determined by an adjustment of the spring force of the coil spring.

9. The engine room undercover assembly for the vehicle of claim 1,
    wherein a plurality of the aerofins is mounted to be symmetrical to each other with respect to a central line in a width direction of the vehicle.

10. The engine room undercover assembly for the vehicle of claim 9,
    wherein the aerofins at positions that are symmetrical to each other with respect to the central line in the width direction of the vehicle are parallel with each other.

11. The engine room undercover assembly for the vehicle of claim 10,
    wherein the aerofins at the positions that are symmetrical to each other with respect to the central line in the width direction of the vehicle gradually become close to each other toward a rear end of the vehicle.

12. The engine room undercover assembly for the vehicle of claim 1,
    wherein a fixing part extended at a certain length in the front-rear direction of the vehicle, and having a fixing hole penetrating both ends thereof formed therein is formed at one side of the aerofin in the width direction of the vehicle.

13. The engine room undercover assembly for the vehicle of claim 12,
    wherein a guide groove of a certain depth having the aerofin inserted therein is formed on the lower surface of the undercover.

14. The engine room undercover assembly for the vehicle of claim 13,
    wherein each of front and rear surfaces of the guide groove is formed with a fixing pin groove that is coaxial with each other in the front-rear direction of the vehicle.

15. The engine room undercover assembly for the vehicle of claim 14,
    wherein the aerofin penetrates the fixing hole, and is fixed to the undercover by the fixing pin having both ends inserted into the fixing pin groove, respectively.

16. The engine room undercover assembly for the vehicle of claim 15,
    wherein a coil spring is inserted into any one side of both ends of the fixing pin.

17. The engine room undercover assembly for the vehicle of claim 16,
    wherein the coil spring is coaxial with the fixing pin, and has one end fixed to the outside surface of the aerofin to apply a spring force to the aerofin.

18. The engine room undercover assembly for the vehicle of claim 17,
    wherein the aerofin is pulled to an undercover side by the spring force of the coil spring.

19. The engine room undercover assembly for the vehicle of claim 13,
   wherein a pressure hole for communicating inner and outer portions of the undercover is formed in a bottom surface of the guide groove.

\* \* \* \* \*